United States Patent

[11] 3,607,358

[72] Inventors Friedrich Dangl
Mechenhard;
Klaus Gerlach, Obernau, both of Germany
[21] Appl. No. 784,938
[22] Filed Dec. 18, 1968
[45] Patented Sept. 21, 1971
[73] Assignee Glanzstoff AG.
Wuppertal, Germany
[32] Priority Dec. 23, 1967
[33] Germany
[31] P 16 19 577.0

[54] METHOD OF DYEING A POLYURETHANE SURFACE LAYER COATED ON A SUBSTRATE AND RESULTANT PRODUCT
13 Claims, No Drawings

[52] U.S. Cl. ....................................................... 117/63,
8/4, 8/41 R, 8/178 E, 117/11, 117/76 T, 117/135.5, 117/140 A, 117/161 KP
[51] Int. Cl. ........................................................ D06n 3/14, D06p 1/02
[50] Field of Search ............................................ 117/138.8 D, 135.5, 76 T, 76 F, 161 KP, 63; 8/4, 178E, 41, 41 B

[56] References Cited
UNITED STATES PATENTS

| | | | |
|---|---|---|---|
| 2,888,450 | 5/1959 | Kruckenberg................ | 8/41 X |
| 3,100,721 | 8/1963 | Holden......................... | 117/135.5 |
| 3,116,278 | 12/1963 | Gross et al. .................... | 8/41 X |
| 3,180,853 | 4/1965 | Peters............................ | 8/4 X |
| 3,262,805 | 7/1966 | Aoki............................ | 117/76 (T) X |
| 3,337,289 | 8/1967 | Manwaring.................117/138.8 (D) X |
| 3,481,767 | 12/1969 | Craven et al.................. | 117/76 (T) |
| 3,496,001 | 2/1970 | Minobe et al................. | 117/135.5 X |
| 3,501,326 | 3/1970 | Hochberg et al. ............ | 117/135.5 X |

FOREIGN PATENTS

| | | | |
|---|---|---|---|
| 756,481 | 4/1967 | Canada ........................ | 8/4 |

*Primary Examiner*—William D. Martin
*Assistant Examiner*—Ralph Husack
*Attorney*—Johnston, Root, O'Keefe, Keil, Thompson & Shurtleff

ABSTRACT: Method of dyeing a polyurethane surface layer of an artificial leather by applying thereto a spirit-soluble dye dissolved in a mixture of organic solvents including at least one solvent which is a swelling agent for the polyurethane.

METHOD OF DYEING A POLYURETHANE SURFACE LAYER COATED ON A SUBSTRATE AND RESULTANT PRODUCT

Polyurethanes have been known for a long time as generally disclosed, for example, in the book "Polyurethanes," by Dombrow, Reinhold Publishing Corp., New York (1957). In the preparation of polyurethanes, it is customary to start with diisocyanates and compounds which have two or more active hydrogen atoms, e.g. hydroxyl-containing compounds such as glycols and polyols. Polymers are obtained by polyaddition which, depending on the reaction conditions and components, are linear or have some branching or cross-linking. By choosing the starting materials skillfully and also by altering the reaction conditions, it is possible to produce a large number of polyurethanes which have substantially different properties and which consequently can be used for many purposes. Thus, polyurethanes can be used as starting material for the manufacture of filaments, solid elastomers or polymers formed by casting, rolling or injection molding methods and various foam materials.

Another very important area of utility for polyurethanes, which is constantly increasing, is in the production of coating and impregnating compositions. Porous nonwoven fibrous materials, woven fabrics and fabric webs can be impregnated and then coated with a polyurethane in order to produce certain properties. For such coating, the polyurethane is most often used in gel form. In these cases, the polyurethane composition may contain up to 20 percent of other polymers as modifying additives, e.g. polyvinyl chloride. The polyurethane composition is coated onto the substrate, e.g. an impregnated bonded nonwoven fibrous material, and is usually spread by means of a doctor blade or by other suitable devices to form a smooth uniform layer. Such materials as a single layer or in laminated form are especially useful in the manufacture of artificial leather.

Polyurethane coatings in the form of a microporous, vapor-permeable, elastomeric layer or sheet are disclosed, for example, in U.S. Pat. No. 3,190,766 which discusses in detail the preparation of the polymer gel, its application to a porous fibrous substrate and its subsequent coagulation, washing and drying to provide the requisite microporous structure. This particular type of procedure is essential in order to achieve an artificial leather coating capable of simulating natural leather in terms of vapor permeability as well as flexibility and other physical properties. Thus, the addition of a vinyl chloride polymer as one component of the polyurethane layer is recommended to improve abrasion resistance.

It is not easy to dye a synthetic leather which is produced in this way, particularly the polyurethane surface layer of the leather, by methods which are used for dyeing polyurethanes which are extruded in the form of filaments or nonporous sheet materials.

Thus, for example, to dye the artificial leather using an aqueous bath solution does not yield satisfactory results. Dyeing in an aqueous bath solution usually requires a comparatively long time and is also carried out at temperatures in the region of 100° C. Such a treatment tends to destroy many of the characteristics of the artificial leather, for example, its pliability and its permeability to water vapor.

It is, of course, possible to dye the polyurethane, e.g. by adding certain colorants such as pigments to the polyurethane composition before it is applied as the covering layer to the bonded nonwoven fibrous substrate. However, this method of dyeing has only a limited application, since it is usually desirable to color the synthetic leather only at a later stage. This subsequent coloring is necessary if the manufacturer is to meet constantly changing fashions in colors and shades. Furthermore, a changeover from one color to another is a complicated problem, particularly in the production of relatively small batches. The cleaning of mixing vessels, pipe conduits, etc., is a lengthy and expensive operation. Furthermore, particularly when using continuously operating machines, transitional batches are produced which do not have the correct shade.

One object of the present invention is to provide an effective and trouble-free method of coloring artificial leather coatings or layers of a polyurethane as conventionally applied to a substrate, i.e. after the polyurethane gel has been completely treated to yield a microporous, vapor-permeable surface structure. Another object of the invention is to provide a method of dyeing such polyurethane coatings as an artificial leather so as to provide extremely high light fastness and excellent resistance to discoloration by scuffing without impairing the desirable leatherlike properties of the product.

In accordance with the present invention, it has now been found that excellent results are achieved in dyeing a polyurethane surface layer, which has been coated on a substrate to provide an artificial leather, if one applies to this surface layer a spirit-soluble, water-insoluble dye dissolved in a mixture of organic solvents, at least one of the solvents being a softening agent for the polyurethane. Mixtures of preferably three or more solvents which consist of individual components which vaporize readily, averagely and with difficulty, i.e. by selecting at least one solvent from each of these three categories which correspond to an evaporation number from between 1 to 10, 10 to 20 and 20 to 100, respectively, are particularly desirable. The best results are obtained when using spirit-soluble, water-insoluble metal complex azo dyestuffs.

Spirit-soluble dyes are soluble in alcohols and also in many other organic solvents. The term "spirit-soluble dyes" includes a well-known and easily identified class of various types of dye. Azo dyes, particularly those complexed with various metals such as chromium, cobalt, etc., are one of the most important types. Further details regarding the constitution of such dyes are given, *inter alia*, in Ullmanns Encyklopadie der technischen Chemie, Volume 7, page 150 *et seq.*

Metal complex compounds of azo dyes have proved to be particularly suitable for use in the method according to the invention. The term "metal complex azo dyes" is intended to indicate those dyes which have a metal atom combined with the dye molecule in a complex form. This complex or coordinate bonding of the metal atom through substituents located in o,o-position to the azo group is thus present in the dye molecule before dyeing and is not formed by reaction of the dyestuff and a metal compound on the surface of the material being dyed, as is the case with the so-called mordant dyestuffs.

Many publications have appeared concerning the chemical structure of various metal complex azo dyes. For example, a large number of such spirit-soluble, water-insoluble metal complex dyes is described in "Kunstliche organische Farbstoffe und ihre Zwischenprodukte," by Hans Rudolf schweizer, Springer-Verlag, Berlin-Gottingen-Heidelberg, 1964. Many of these metal complex dyes are also readily available under various trademarks, and even where the structures of these trademarked dyes are not published, they are always clearly identified as spirit-soluble dyes.

To dissolve the dyestuff, it is essential to employ a mixture of organic solvents. Organic solvents which can be used in the mixture are, by way of example, such compounds as ether, acetone, methyl alcohol, butyl acetate and methyl Cellosolve acetate. The term "ether" refers to ethyl ether, i.e. diethyl ether. The compound methyl Cellosolve acetate is also identified as ethylene glycol monomethyl ether acetate and is sometimes referred to more simply as "methyl glycol acetate." At least one organic solvent of the mixture must be a softening agent for the polyurethane which has been used for the production of the surface layer. Acetone, methyl Cellosolve acetate and many other organic solvents are examples of substances which have such a softening action on polyurethanes.

It has proved to be especially desirable to use a mixture of solvents in which at least three different components have distinctly different volatilities. It is thus preferred to use solvent mixtures which consist of at least one solvent which vaporizes readily, at least one which has an average rate of vaporization and finally at least one which vaporizes averagely with difficulty. The evaporation numbers of these three classes of solvents corresponds to values of 1 to 10, 10 to 20 and 20 to 100, respectively. This evaporation number is a standard for the speed of vaporization of solvents and is measured according to DIN (German Industrial Standard) Specification No. 53 170.

The following table gives the evaporation number for a number of solvents from which suitable solvent mixtures can be prepared, those solvents which act as a softening or swelling agent for polyurethane being marked with an asterisk.

TABLE

| Solvent | Evaporation Number |
|---|---|
| ether | 1 |
| acetone* | 2.1 |
| ethyl acetate | 2.9 |
| methanol | 6.3 |
| butyl acetate | 12.5 |
| n-butanol | 33 |
| methyl Cellosolve acetate* | 35 |

A typical 3-component mixture used in the method according to the invention comprises, for example, acetone, butyl acetate and methyl cellosolve acetate. The invention is obviously not limited to 3-component mixtures.

The relative proportions of the separate constituents in a solvent mixture can be varied within relatively wide limits. It is only necessary to ensure that the solvent mixture contains enough softening agent to ensure that the softening action will be effective during the dyeing operation. This softening or swelling depends in part on the conditions used for dyeing, e.g. the dyeing time and temperature.

In general, one can employ about equal parts by volume of each of the solvent components, although it is preferable to employ a smaller proportion of the least volatile component having an evaporation number of 20 to 100, particularly where it also serves as a softening agent. In terms of the amount of at least one solvent which acts as the softening agent, its proportion in the total solvent mixture as a percentage by volume may range from 10 to 50 percent. On the other hand, it is preferable to work within the following percentages by volume with reference to solvents of different volatility:

| Evaporation Number | % by volume |
|---|---|
| 1 to 10 | 10–50 |
| 10 to 20 | 5–90 |
| 20 to 100 | 10–50 |

Dyes which can be employed in the method according to the invention include the commercial products which are sold under the trademarks Orasol (CIBA, AG) or Savinyl (SANDOZ,AG). Examples of these dyes with the corresponding identification in the Color Index, are as follows:

Orasolschwarz B      (C.I. Solvent Black 6)
Orasolschwarz 2 RG   (C.I. Solvent Black 2)
Savinylgelb BRLS     (C.I. Solvent Yellow 62)
Savinylbraun GLS     (C.I. Solvent Brown 28)

Especially good results are achieved by uniformly spraying the solution onto the exposed surface of the polyurethane layer, e.g. so as to use about 0.5 to 5 grams/m.$^2$ of the dye, depending upon the desired shade of color. The concentration of the dye in the mixture of organic solvents as applied to the polyurethane should normally be about 5 to 50 grams/liter, and it is especially desirable to carry out the dyeing at about room temperature up to not more than 90° C., including the drying time required for complete evaporation of the solvent mixture. It is also important to apply the dye solution only to the outwardly facing surface of the polyurethane layer, i.e. bath dyeing in the dye solution must be avoided. The dye solution can be applied not only by spraying on the synthetic leather but also by pouring, brushing, pressing or by other methods of surface application.

After dyeing is completed, the colored surface layer of polyurethane is further enhanced by using a second application of the dye solution in admixture with any conventional sealing lacquer, preferably after first embossing the initially dyed artificial leather. The dye solution in this case is most conveniently the same solution used in the initial application and should be present in the total mixture with the sealing lacquer in a proportion of 10 to 40 percent by volume. Suitable sealing lacquers including the following:

Bosco Spray Finish SF 321 (nitrocellulose dissolved in an organic solvent mixture having a boiling point range of 60–150° BH C.)
Nitrocellulose E 560 and E 620.

Dyeings which have excellent brilliance and covering power are obtained by the method according to the invention. The light fastness, with values from 6 to 7, is also very good. The water-fastness and resistance to rubbing of the dyeings obtained by this method are also very good. When compared with previously used dyeing methods, the process of the invention is very easy to carry out. The dyeing operation can also be accomplished in an extremely short period of time, usually about 2 to 5 minutes.

The presence of at least one solvent which is a softening agent for the polyurethane is essential to facilitate the penetration of the dye into the polyurethane surface layer. The method according to the invention consequently permits particularly deep dyeing effects.

This deep dyeing is of great importance with polyurethane surface layers which are produced in the manufacture of a synthetic leather. Those materials which are to be used as upper leathers in the manufacture of shoes are ones in which it is important to obtain the deepest possible dyeing. The upper leather of the shoe is exposed to many external effects in wear. Thus, the leather can be damaged or scuffed by pointed stones and sharp edges. If the penetration of the dye is insufficient, undesirable differences in color become immediately noticeable at damaged or scuffed areas. This problem is substantially avoided with the dyeings produced by the method according to the invention.

The permeability to water vapor and the flexibility of an upper leather is also fully maintained in the dyeing process, and this result is extremely important for the wearing properties or longevity of any synthetic leather product. Surprisingly, the microporous structure and resilience of the artificial leather is not seriously affected by dyeing with a solvent containing a softening agent, provided that one employs organic solvent mixtures as prescribed herein.

The invention is further illustrated by the following examples:

EXAMPLE 1

15 grams of a water-insoluble metal complex azo dye, Orasol Braun GR (C.I. Solvent Brown 34) are dissolved with vigorous stirring in a mixture consisting of 375 ml. of acetone, 500 ml. of butyl acetate and 125 ml. of methyl Cellosolve acetate. This dye solution is sprayed at about 20° C. through two 0.6 mm. spray nozzles onto an artificial leather, which has a microporous surface layer of a polyurethane produced in known manner by reacting a butanediol/adipic acid ester with 4,4'-diphenylmethane diisocyanate and subsequently extending with butanediol as a chain lengthening agent. This polyurethane surface layer is coated as a gel on a bonded nonwoven fibrous substrate, and coagulated and washed in the usual manner to impart the desired artificial leather properties. About 4 grams of dye are used per square meter of the polyurethane surface. The dye solution penetrates to a depth of approximately 35 m$\mu$. After careful drying at about 80° C., the artificial leather is embossed and provided with a conventional sealing lacquer, of which 1000 ml. also contains 350 ml. of the dyestuff solution described above.

The upper leather dyed by this method has a good permeability to water vapor. The fastness to water is 4 (highest grade = 5). The light fastness is outstanding, giving results of 6 to 7 (highest grade = 7) and is far above light fastness values which are found with natural leather. The measurement of flexibility was carried out with a BALLY flexometer in accordance with IUP Specification No. 20 and exhibited 200,000 flexings.

EXAMPLE 2

Exactly the same procedure, including all proportions, is followed as in example 1 except that the metal complex azo dye in this case is Savinyl Rot 4 BLS (C.I. Solvent Red 85). The same excellent results are achieved in terms of good vapor permeability and flexing, and again the water fastness is 4 and the light fastness is 6 to 7.

Further examples are carried out using the same procedure as in example 1 but with each of the following dye solutions, again obtaining similar excellent results.

EXAMPLE 3

|  | Amount |
| --- | --- |
| Dye: Orasolschwarz BV<br>Organic Solvent Mixture | 17.6 grams |
| a. Acetone | 347.0 g. |
| b. Acetic acid n-butyl ester | 517.0 g. |
| c. n-Butanol | 118.4 g. |

EXAMPLE 4

| Dye: Savinylbraun GLS:<br>Savinylgelb GRL = 2.1<br>Organic Solvent Mixture | 15 grams |
| --- | --- |
| a. Acetone | 300 ml. |
| b. Methyl isobutyl ketone | 620 ml. |
| c. n-Butanol | 80 ml. |

EXAMPLE 5

|  | Amount |
| --- | --- |
| Dye: Orasolbraun 5R<br>(C.I.Solvent Brown 35)<br>Organic Solvent Mixture | 750 grams |
| a. Acetone | 18.75 liters |
| b. Butyl acetate | 25.00 liters |
| c. Methyl glycol acetate | 6.25 liters |

The invention is hereby claimed as follows:

1. A method of dyeing a polyurethane surface layer coated on a substrate to provide an artificial leather, said method comprising:
   applying to said polyurethane surface layer a dye solution consisting essentially of a spirit-soluble, water-insoluble dye dissolved in a mixture of organic solvents, at least one of which is a swelling agent for said polyurethane in a proportion sufficient to cause penetration of the dye into said surface layer; and
   drying the thus treated polyurethane surface layer for substantially complete evaporation of said solvent mixture.

2. A method as claimed in claim 1 wherein said spirit-soluble dye is a metal complex azo dyestuff.

3. A method as claimed in claim 1 wherein said mixture of organic solvents includes at least one solvent with an evaporation number between 1 and 10, at least one solvent with an evaporation number between 10 and 20 and at least one solvent with an evaporation number between 20 and 100.

4. A method as claimed in claim 3 wherein said spirit-soluble dye is a metal complex azo dyestuff.

5. A method as claimed in claim 1 wherein said mixture of organic solvents consists essentially of acetone, butyl acetate and methyl Cellosolve acetate.

6. A method as claimed in claim 5 wherein said spirit-soluble dye is a metal complex azo dyestuff.

7. A method as claimed in claim 1 wherein the dye solution is sprayed onto the polyurethane surface layer.

8. The dyed product obtained by the method of claim 1.

9. A method as claimed in claim 1 wherein, after drying, a sealing lacquer is applied to the dyed layer in admixture with a minor proportion of said dye solution.

10. A method as claimed in claim 1 wherein the steps of application of the dye solution and drying are carried out at about room temperature up to not more than 90° C.

11. A method as claimed in claim 1 wherein said mixture of organic solvents consists essentially of acetone, butyl acetate and n-butanol.

12. A method as claimed in claim 1 wherein said mixture of organic solvents consists essentially of acetone, methyl isobutyl ketone and n-butanol.

13. A method as claimed in claim 1 wherein the proportion of said organic solvent which is a swelling agent for said polyurethane is approximately 10 to 50 percent by volume.